No. 812,559. PATENTED FEB. 13, 1906.
W. F. FRUEHAUF.
CLINICAL THERMOMETER.
APPLICATION FILED APR. 1, 1905.

Witnesses

Inventor
William F. Fruehauf
By his Attorneys

UNITED STATES PATENT OFFICE.

WILLIAM F. FRUEHAUF, OF PLAINFIELD, NEW JERSEY.

CLINICAL THERMOMETER.

No. 812,559.	Specification of Letters Patent.	Patented Feb. 13, 1906.

Application filed April 1, 1905. Serial No. 253,355.

*To all whom it may concern:*

Be it known that I, WILLIAM F. FRUEHAUF, a citizen of the United States, and a resident of Plainfield, in the county of Union and State of New Jersey, have invented certain new and useful Improvements in Clinical Thermometers, of which the following is a specification.

This invention relates to clinical thermometers and aims to provide a thermometer of this type which is very durable, being securely protected at all times against breakage, but which is nevertheless rapidly acted upon by the heat when in use.

A further object of the invention is the pro15 vision of means for preventing the wearing off or erasure of the graduations and indicating-numerals upon the tube of the thermometer.

The invention also contemplates the pro20 vision of a sheathed clinical thermometer of superior aseptic qualities, it being readily washed or cleansed.

With these ends in view the invention consists in a clinical thermometer embodying the novel features to be hereinafter described and finally recited in the claims.

Figure 1:
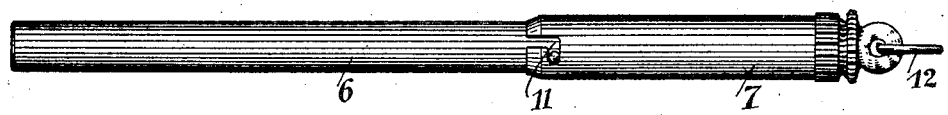
Figure 2:
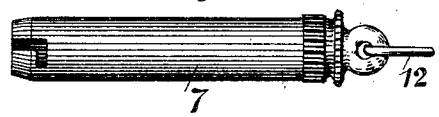
Figure 3:
Figure 5:
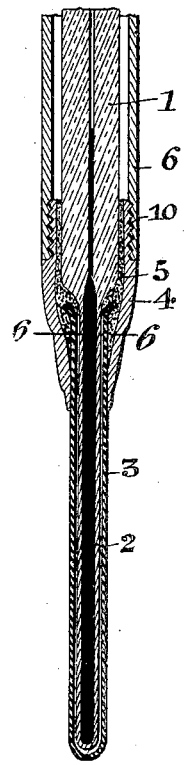
Figure 4:
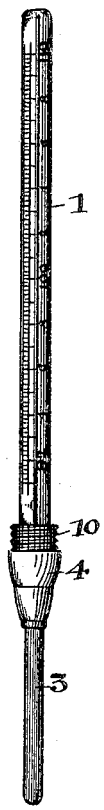
Figure 6:
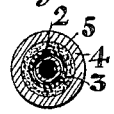

In the accompanying drawings, Figure 1 is an elevation of a clinical thermometer embodying my invention. Fig. 2 is an eleva30 tion of the cap for protecting the bulb end of the thermometer. Fig. 3 is an elevation of the thermometer with the cap removed. Fig. 4 is an elevation of the same with the tube-sheath also removed. Fig. 5 is a vertical central section of the thermometer as shown in Fig. 4, but drawn on a larger scale; and Fig. 6 is a horizontal transverse section taken on line 6 6, Fig. 5.

Similar characters of reference indicate corresponding parts throughout the several views.

The particular form of the thermometer proper used in the present invention is immaterial; but in the embodiment illustrated the thermometer is of the usual type, consisting of a graduated glass-tube portion 1, made integral with an elongated tubular bulb portion 2 of less diameter than said tube portion and in which the mercury or other expansible fluid is contained. A tubular sheath 3, made from metal of high specific heat and closed at one end, fits tightly about the bulb 2 and completely incloses the same throughout the length thereof, the open end of said sheath being adjacent the connection of the bulb 2 and the tube 1. An intermediate sleeve 4 incloses for a short distance the sheath 3 and the tube 1 and is of such a size as to permit the interposition of a body of cement 5 between said sleeve and the tube 1 and between said sleeve and the sheath 3, so that said sleeve is thereby rigidly fixed to the thermometer, as shown.

In order to prevent the sheath 3 from being withdrawn from the sleeve 4, it is flared slightly at its open end, so as to be firmly and permanently retained by the mass of cement and said sleeve. The end of the sleeve 4 which is adjacent the bulb-sheath is restricted, as shown in Figs. 4 and 5, in order to tightly inclose said sheath, while the opposite end of said sleeve is enlarged and spaced from the tube by a thin layer of cement, as shown, said end being provided with exterior screw-threads 10.

In addition to the sheath 4 for protecting the bulb of the instrument a tube-protecting sheath 6 is also provided, which is adapted to inclose the tube of the instrument and provided at its open end with interior screw-threads adapted to engage the threads 10 of the sleeve 4. In this manner the entire instrument is securely inclosed. A cap 7 for further protecting the bulb portion of the instrument and for permitting the suspension of the same from a hook or suitable support when the instrument is not in use is adapted to inclose the bulb portion of the instrument and is locked on the body of the instrument by means of a bayonet-joint 11, as shown in Fig. 1, the lug of said joint being preferably punched up from the tube-sheath 6. The cap 7 is provided at its closed end with a ring 12 for permitting the supension of the thermometer, as explained.

It will be readily understood that the bulb-sheath is of great value in protecting the bulb against breakage, either when the thermometer is in use, by the pressure of the parts of the body upon the same, or when carried about in the pocket or otherwise exposed to breakage. The tube-sheath performs the same function for the tube of the thermometer, the two sheaths and the intermediate sleeve forming a casing for the instrument, which will obviate the breakage of the same even when dropped upon the floor. Owing to the fact that the bulb-sheath is made of a metal having a high specific heat, the rise of the mercury in the tube when the instrument is in use is not retarded. The tube-sheath may remain on the instrument when in use in order to prevent the wearing off of the graduations and indicating-numerals, after which the same is removed in order to take the reading. After use the saliva or other adhering matter may be readily removed from the instrument by washing or cleansing in the usual manner.

The improved thermometer has been found extremely durable in use, as liability to accidental breakage of the same is obviated in a great degree. The instrument also has the advantage that it can be readily sterilized, that it is extremely convenient in use, and that in spite of the advantages thereof the cost of the same is not appreciably greater than that of the clinical thermometers now upon the market.

Having thus described my invention, I claim as new and desire to secure by Letters Patent—

1. A clinical thermometer having a sleeve affixed thereto by means of cement, and a bulb-sheath extending beneath said sleeve into said cement.

2. The combination, with a clinical thermometer, of a sleeve surrounding the same and fixed thereto, and a bulb-sheath extending at its open end beneath said sleeve, said end being flared.

3. The combination, with a clinical thermometer, of a sleeve surrounding the same, cement interposed between said sleeve and said thermometer, and a sheath inclosing the bulb of the thermometer, and provided with a flared end disposed beneath said sleeve and embedded in said cement.

4. The combination, with a clinical thermometer, of a sleeve fixed to the same, by means of cement, at the junction of the bulb and tube portions, and provided at the end near the latter with screw-threads, a bulb-sheath extending beneath said sleeve and retained by said cement, and a tube-sheath having screw-threads engaging those of said sleeve.

5. The combination, with a clinical thermometer, of a tube-protecting sheath, a bulb-protecting sheath, a sleeve fixed to the thermometer and retaining said sheaths, and a cap attached to the tube-sheath and inclosing the bulb-sheath.

In testimony that I claim the foregoing as my invention I have signed my name in presence of two subscribing witnesses.

WILLIAM F. FRUEHAUF.

Witnesses:
PAUL GOEPEL,
HENRY J. SUHRBIER.